US009400019B2

(12) United States Patent
Skipper et al.

(10) Patent No.: US 9,400,019 B2
(45) Date of Patent: Jul. 26, 2016

(54) FRICTION RING, SYNCHRONIZER UNIT, AND GEAR CHANGING TRANSMISSION FOR A VEHICLE

(71) Applicant: Sulzer Friction Systems (Germany) GmbH, Bremen (DE)

(72) Inventors: Gary I. Skipper, Swansea (GB); Marcus Spreckels, Sagehorn (DE); Ulf Christoffer, Bremen (DE); Sebastian Augustin, Bremen (DE)

(73) Assignee: OERLIKON FRICTION SYSTEMS (GERMANY) GMBH, Bremen (DE)

( * ) Notice: Subject to any disclaimer, the term of this patent is extended or adjusted under 35 U.S.C. 154(b) by 0 days.

(21) Appl. No.: 13/915,666

(22) Filed: Jun. 12, 2013

(65) Prior Publication Data

US 2013/0333998 A1 Dec. 19, 2013

(30) Foreign Application Priority Data

Jun. 18, 2012 (EP) ..................... 12172322

(51) Int. Cl.
*F16D 23/06* (2006.01)
*F16D 23/02* (2006.01)

(52) U.S. Cl.
CPC ............ *F16D 23/025* (2013.01); *F16D 23/06* (2013.01); *F16D 2023/0681* (2013.01)

(58) Field of Classification Search
CPC ..................... F16D 23/025; F16D 2023/0681
USPC ................ 192/53.1, 53.3, 53.32, 53.34, 66.2, 192/66.21
See application file for complete search history.

(56) References Cited

U.S. PATENT DOCUMENTS 3,414,098 A * 12/1968 Kelbel ................. F16D 23/06
192/48.9
4,698,889 A 10/1987 Patzer
(Continued)

FOREIGN PATENT DOCUMENTS

DE 197 19 618 11/1998
DE 198 53 856 5/2000
(Continued)

OTHER PUBLICATIONS

Machine translation of the description of DE 102008061967 downloaded from EPO.org on Aug. 8, 2014.*
(Continued)

*Primary Examiner* — Richard Lorence
(74) *Attorney, Agent, or Firm* — Robert S. Green

(57) ABSTRACT

The invention relates to a friction ring for a synchronizer unit (2) of a gear changing transmission, which friction ring includes a conical friction ring body (3) having an inner friction surface (301) and an outer installation surface (302) preferably configured as a further friction surface which friction surface (301) and installation surface (302) respectively bound the friction ring body (3) in a radial circumferential direction (U) extending perpendicular to a axial friction ring axis (4) in which the inner friction surface (301) conically extends along the friction ring axis (4) at a pre-determinable friction angle ($\alpha_1$) and the outer installation surface (302) also conically extends along the friction ring axis (4) at a pre-determinable installation angle ($\alpha_2$) respectively. In accordance with the invention the friction angle ($\alpha_1$) is different from the installation angle ($\alpha_2$). Furthermore, the invention relates to a synchronizer unit (2), as well as to a gear changing transmission for a vehicle.

20 Claims, 6 Drawing Sheets

(56) References Cited

U.S. PATENT DOCUMENTS

| | | | | |
|---|---|---|---|---|
| 4,732,247 A | * | 3/1988 | Frost | ............... F16D 23/06 192/53.31 |
| 4,742,723 A | | 5/1988 | Lanzerath | |
| 5,560,461 A | * | 10/1996 | Loeffler | ............... F16D 23/06 192/53.32 |
| 6,065,579 A | | 5/2000 | Nels | |
| 6,588,563 B1 | * | 7/2003 | Sarrach et al. | ............. 192/53.34 |
| 7,121,393 B1 | * | 10/2006 | Skipper et al. | ............. 192/48.91 |
| 8,342,307 B2 | | 1/2013 | Christoffer | |
| 2008/0067026 A1 | * | 3/2008 | Spreckels | ............. 192/53.34 |
| 2008/0149450 A1 | | 6/2008 | Christoffer | |
| 2009/0133982 A1 | | 5/2009 | Christoffer | |
| 2015/0167749 A1 | * | 6/2015 | Skipper | ............. F16D 23/025 192/53.34 |

FOREIGN PATENT DOCUMENTS

| | | | |
|---|---|---|---|
| DE | 199 22 325 | 7/2000 | |
| DE | 102007058573 A1 | 6/2009 | |
| DE | 102008061967 A1 | 6/2010 | |
| EP | 1199489 A1 | 4/2002 | |
| EP | 1312823 A1 * | 5/2003 | ............ F16D 23/06 |
| EP | 1507091 B1 | 8/2006 | |
| JP | 58-74628 | 5/1983 | |
| JP | 62-46047 | 2/1987 | |
| JP | 62-46048 | 2/1987 | |
| JP | 8-219173 | 8/1996 | |
| JP | 8-219175 | 8/1996 | |
| JP | 10-78047 | 3/1998 | |
| JP | 2004-76764 | 3/2004 | |
| JP | 2005-344849 | 12/2005 | |

OTHER PUBLICATIONS

Machine translation of the description of EP 1199489 downloaded from EPO.org on Aug. 9, 2014.*
Machine translation of EP 1312823 A1 downloaded from EPO.org on Nov. 10, 2015.*
European Search Report for patent application 12172322.5, Nov. 16, 2012.
English abstract for DE102007058573A1 , downloaded from espacenet.com on Apr. 24, 2014.
English abstract for DE102008061967A1 , downloaded from espacenet.com on Apr. 24, 2014.
English abstract for EP1199489A1 , downloaded from espacenet.com on Apr. 8, 2014.

* cited by examiner

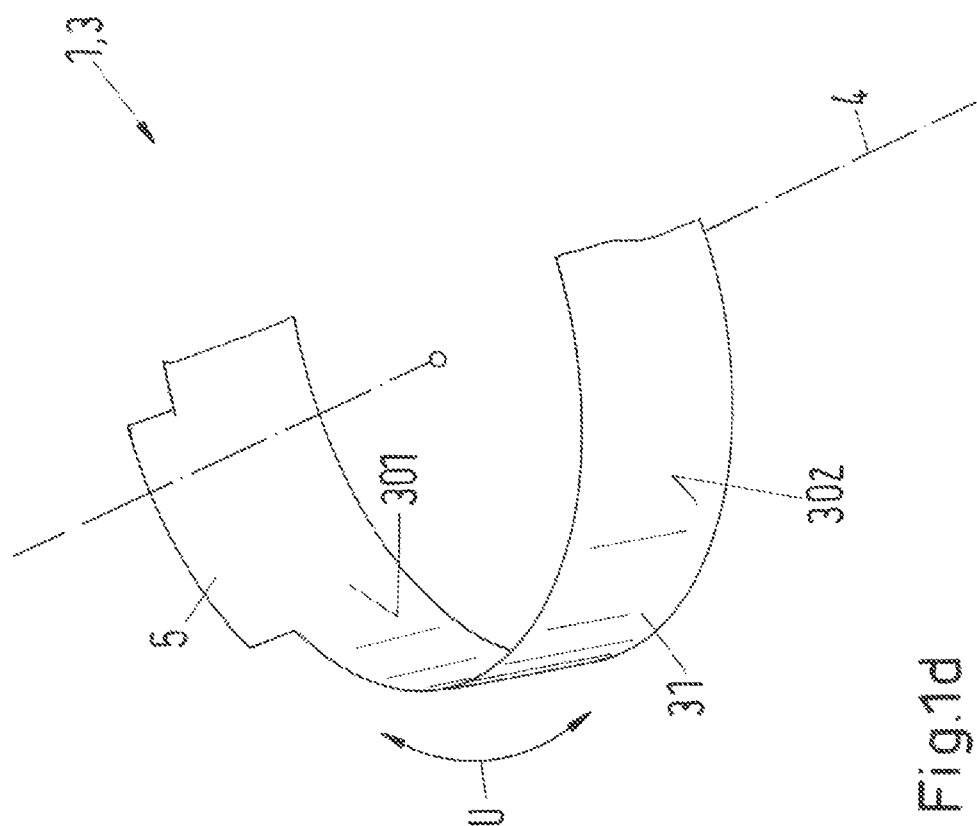

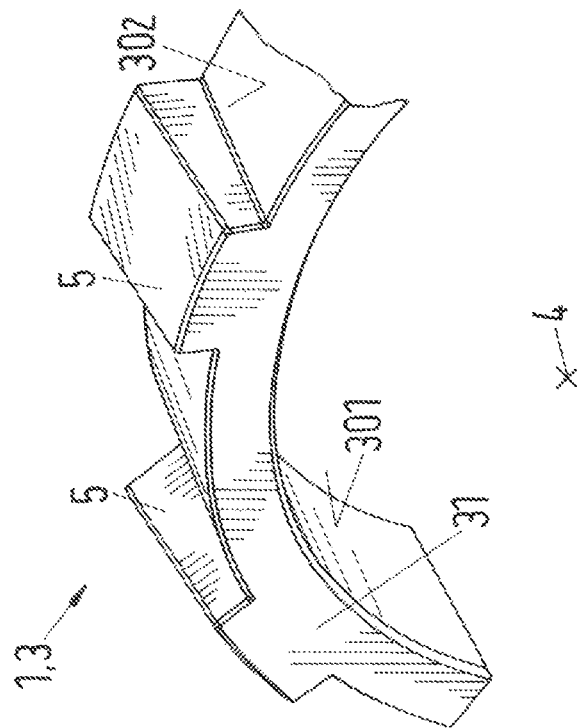
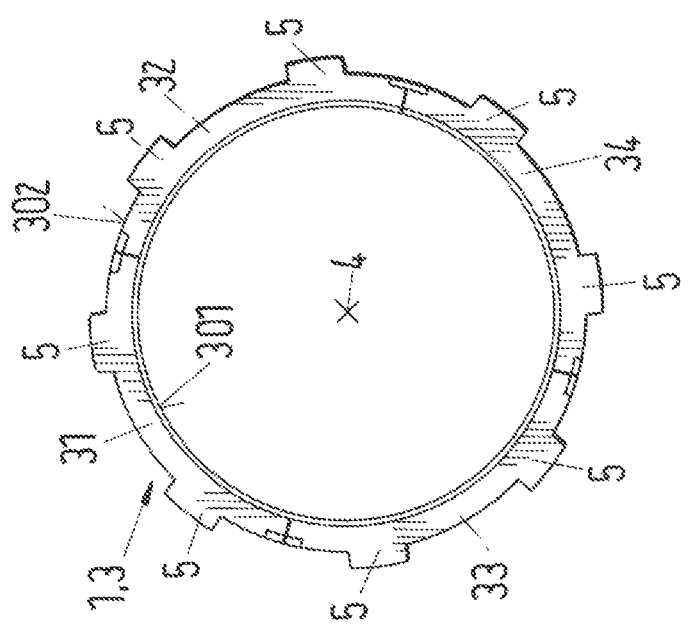

FRICTION RING, SYNCHRONIZER UNIT, AND GEAR CHANGING TRANSMISSION FOR A VEHICLE

The present application claims priority under 35 U.S.C. §119 of European Patent Application No. 12172322.5 filed on Jun. 18, 2012, the disclosure of which is expressly incorporated by reference herein in its entirety.

The invention relates to a friction ring for a synchronizer unit of a shiftable gear changing transmission, to a synchronizer unit, as well as to a gear changing transmission for a vehicle in accordance with the preamble of the independent claims.

In a mechanical shiftable gear changing transmission, for example, in vehicle transmissions, synchronizer rings serve to match the relative speeds between the gear wheel and the transmission shaft occurring during a gear shift to one another. In this respect the synchronization is achieved by means of friction between the corresponding friction partners. The mode of operation of such transmissions and the sequence of the synchronization process are known per se and do not need to be explained to the person skilled in the art in this context any further in detail.

Providing the friction surfaces of synchronizer rings, which are generally made of metal or a metal alloy, such as, for example, brass or steel, with a friction layer, is known for protection against premature wear and/or for the improvement of the friction characteristics. In this respect many different types of friction layers are found in use, for example, thermal spray layers of molybdenum, carbon friction layers or friction layers made out of other materials.

Synchronizer units for gear changing transmissions or individual components of synchronizer units are described in the prior art in a variety of ways and in detail.

Thus manual transmissions and dual clutch transmissions, for example, are the dominant type of transmission in many applications today in the small and medium car sector, in particular for front-transverse drives. The shifting characteristics of these types of transmissions is essentially determined by the synchronizer, whose fundamental principle is today, like in the past, based on the so-called Borg Warner Concept, which was described in detail for the first time in EP 1 507 091 B1. The requirements which are becoming increasingly important for the system synchronizer are a high efficiency for realizing short shifting times with small shifting forces and a high comfort in shifting.

In this connection the geometric design of a classic Borg Warner synchronizer with regard to efficiency and comfort in shifting is determined by a conflict of objectives. A high efficiency is achieved by small cone angles of the friction paring; the reinforcing effect of the cone generates high synchronization torque despite small operating forces. In contrast to this the self-locking effect, which prevents a release of the friction surfaces and substantially and noticeably influences the driver's comfort in shifting, sets a natural lower limit for minimization of the cone angle. Thus optimizing a synchronizer always entails a compromise between efficiency and comfort in shifting.

The dominant type of synchronizers used in the transmissions known best to the person skilled in the art, e.g. manual, automated manual and dual clutch transmissions, are adapted in the conventional Borg Warner design in accordance with EP 1 507 091 B1, Due to constant demands for better shifting performance and higher torque, sophisticated multi-cone system synchronizers have been developed on this basis, with double, triple and for certain niche applications even with quadruple friction surfaces. These highly developed synchronizer modules have increased performance and torque capacities due to the plurality of friction surfaces and the advanced friction material properties. Nevertheless, they also increase the complexity, cost and last but not least the weight of the corresponding transmission.

Although these types of synchronizers have been continuously optimized in terms of manufacturing processes and performance, a design conflict has remained up to now.

One of the most critical features in the construction of synchronizers is namely the design of the angles of the involved conical friction surfaces. This important feature determines two main functions:

On the one hand, the synchronizer performance. In combination with the diameter of the cone and the coefficient of friction between the gear wheel and the cone surface of the synchronizer ring, the cone angle is namely one of the most important factors in determining the friction torque. Reducing the cone angle increases the torque. The shifting force is thereby decreased and shorter synchronization times can be realized.

However, on the other hand, also the shifting quality in terms of the release of the friction cones at the end of synchronization. The cone angle has a significant influence on the determination of the quality of the shifting sensation for the driver. Too small of an angle can generate undesirable effects, such as, for example, blocking or secondary pressure points.

A small cone angle is required in order to achieve a maximum shifting performance. However, a large cone angle is required in order to optimize the design in terms of shifting quality. A design trade-off with regard to the design thus results from this for conventional synchronizers.

For this reason, depending on the requirements, differences in design for the different transmission types exist in the prior art. For example, the focus is on synchronizer performance for dual clutch transmissions and less so on shifting quality. In contrast to this manual transmissions attempt to reach a balance between performance and shifting quality.

In this connection, in order to increase the synchronizer performance with regard to small shifting forces and short shifting times, torque capacities must be increased as was already mentioned. However, every synchronizer is limited to a specific attainable performance through its design and application, be it by its diameter, coefficient of friction or the minimum cone angle.

In general, the design engineer was previously only able to add additional friction surfaces in order to increase performance or torque capacities, i.e. this means from a single cone to multiple cones. Nevertheless even for additional friction surfaces the torque capacities have functional limits due to the cone angle.

During the actual synchronization, the applied force (F) controls the synchronizer having the reaction forces $F_{ax}$ and $F_{rad}$. With the aid of a coordinate system, this can then be split into $F_R$ (friction) and $F_N$ (normal force), in which the angle $\rho$ is equal to $\rho = \tan^{-1}\mu$ and $\alpha$ is the cone angle. For the system to be in equilibrium, a force $F_U$, which is the tangential force in the material, must counteract the radial force $F_{rad}$.

During the release, a force additional to the force $F_U$ is required to separate the ring from the gear wheel cone. The friction force $F_R$ now points in the opposite direction from during the synchronization process and $\alpha < \tan^{-1}\mu$ ($\mu$ is the static coefficient of friction). This effect is referred to as self-locking and negatively affects the shifting quality. The functional limit for all synchronizers is $\alpha > \tan^{-1}\mu$.

If the cone angle is further reduced within the system to improve torque capacities, the level of secondary pressure points also increases due to self-locking. Thereby the shifting is perceived, as unpleasant. In extreme cases, it can also bring about the effect that the system is completely blocked.

Thus the object of the invention is to provide an improved synchronizer mechanism and the components necessary for the synchronizer mechanism so that the disadvantages described in the introduction and known from the state of the art can be avoided. The trade-off with regard to efficiency and comfort in shifting should in particular be solved by the present invention. This means that, on the one hand, a high efficiency of the friction pairing should be achieved, i.e. a reinforcing effect should be achieved, so that the cone can generate large synchronization torques despite small operating forces. On the other hand, the self-locking effect which prevents or impairs the release of the friction surfaces and substantially and noticeably influences the driver's comfort in shifting should be avoided if possible or reduced to an acceptable degree. The object of the invention is therefore an optimization of the synchronizer without having to account for the compromise between efficiency and comfort in shifting which are necessary in the state of the art.

The subject matter of the invention which satisfies these objects is characterized by the features of the independent claims.

The independent claims relate to particularly advantageous embodiments of the invention.

The invention thus relates to a friction ring for a synchronizer unit of a gear changing transmission, which friction ring includes a conical friction ring body having an inner friction surface and an outer installation surface, which outer installation surface is preferably configured as a further friction surface, and which inner friction surface and outer installation surface bound the friction ring body in a radial circumferential direction extending perpendicular to an axial friction ring axis and the inner friction surface conically extends along the friction ring axis at a pre-determinable friction angle and the outer installation surface conically extends along the friction ring axis at a pre-determinable installation angle. In accordance with the invention the friction angle is different from the installation angle.

It is essential for the invention that the friction ring is configured so that the friction angle is different from the installation angle. Thereby the trade-off between efficiency and comfort in shifting that has long existed in the state of art is reliably solved for the first time. This means that, on the one hand, a high efficiency of the friction pairings is achieved by the invention, thus a reinforcing effect is achieved, so that the cone can generate large synchronizer torques despite small operating forces. On the other hand, the known detrimental self-locking effect, which prevents or at least impairs the release of the friction surfaces and substantially and noticeably influences the comfort in shifting for the driver, is at the same time practically completely avoided by the invention. Thus it is possible for the first time by the invention that the compromise between efficiency and comfort in shifting required in the state of the art no longer has to be accepted.

The novel approach in accordance with the invention for resolving this trade-off is to physically separate the function which "generates synchronizer torque" from the function which "releases the friction pairing," which functions were so far combined in one and the same friction pairing. The separation is achieved by a friction ring having different cone angles on its inner and outer diameters, which ring is preferably but not necessarily segmented. One diameter generates the synchronizer torque by means of a force fit; the other diameter ensures the reliable release of the force fit. Thus in accordance with the invention an independent optimization of both functions with regard to their special requirements occurs. By means of the invention, it was determined for the first time that by physically separating the functions of the synchronizer performance (generation of small shifting forces and short shifting times) from the shifting quality (secondary pressure point and self-locking effects) it is possible to resolve the known trade-off. In the classic design known from the state of the art both functions are directly connected to each other via the cone angle which led to the illustrated previously identified unavoidable optimization problems.

In this connection, also further essential requirements are satisfied by means of the invention, which requirements are essential in certain cases, in order to achieve the desired result.

The design in accordance with the invention having an installation angle different from the friction angle accommodates the overall spectrum of requirements on torque capacities and comfort in shifting faced by today's conventional synchronizers. The components of the synchronizer unit in accordance with the invention fit into the available installation space. The manufacture of components in accordance with the invention is also possible using steel stamped parts, which can thus be manufactured easily and cost effectively. The components of the present invention, in particular the friction ring, are suitable for the application and coating with existing technologies and processes and are also suitable for the friction materials available, wherein, at the same time, the production costs and unit costs are at least the same or in practice frequently lower than for the multiple synchronizers known today.

The innovative solution approach of the present invention namely of physically separating the two functions of synchronization and releasing, is substantially achieved by a small angle to the conical friction surface, which small angle improves the performance or the torque capacities, and by a large angle for releasing the system, by means of which the negative influences of the self-locking effect are overcome, which lead to a poor quality of shifting.

In a particularly preferred embodiment of the present invention a further critical factor is also addressed: namely the forces in the circumferential direction ($F_U$) within the friction ring. Depending on the application and the embodiment it is namely possible that self-locking can occur on the gear cone due to the small angle. In order to exclude this risk, the friction ring can also be segmented.

An external force F is applied to the synchronizer ring during the synchronization in a manner known per se. This generates external radial forces which act on the segment $F_{rad}$. The reaction forces $F_{ax}$ and $F_{rad}$ at the friction surface are in equilibrium and are the same forces that are known from a conventional synchronizer. The external force is dissolved after the synchronization, once the teeth of the sliding collar have passed the teeth of the synchronizer ring. The large angle cuts through $\alpha_2 < \tan^{-1} \mu_2$ and therefore there is no $F_{rad}$ which acts on the segments, and since there is no material stress within the segments by means of the friction element not being a fixed ring, the small angle separates since no internal or external forces are acting on the small angle.

The invention further relates to a shifting transmission for a vehicle, in particular for a passenger vehicle, a transporter or a commercial vehicle which shifting transmission has a synchronizer ring in accordance with any one of the preceding claims.

BRIEF DESCRIPTION OF THE DRAWINGS

In the following the invention will be explained in detail by means of the schematic drawing. There is shown:

FIG. 1c shows a section along the sectional line I-I in accordance with FIG. 1a;

FIG. 1d shows a portion of the friction ring in accordance with FIG. 1a and FIG. 1b in perspective view;

FIG. 2a shows a second embodiment of a segmented friction ring in accordance with the invention having a radial security against rotation;

FIG. 2b shows a perspective view of a portion of the friction ring in accordance with FIG. 2a;

FIG. 1a and FIG. 1b respectively FIGS. 1c and 1b show one and the same very simple embodiment of a friction ring in accordance with the invention in a schematic illustration, which friction ring has a segmented friction ring body, wherein the friction ring is generally referred to in the following with the reference numeral 1.

In this respect FIG. 1a shows the friction ring 1 in an expanded configuration, while FIG. 1b shows the same friction ring in a contracted configuration. FIG. 1c shows a section of the friction ring 1 along the sectional line in accordance with FIG. 1a for a better understanding, while a portion of the friction ring 1 in accordance with FIG. 1a or FIG. 1b is shown in a perspective view in FIG. 1d in order to be able to better see the security against rotation 5 extending along the friction ring axis 4 of the friction ring 1.

Figure 1A:
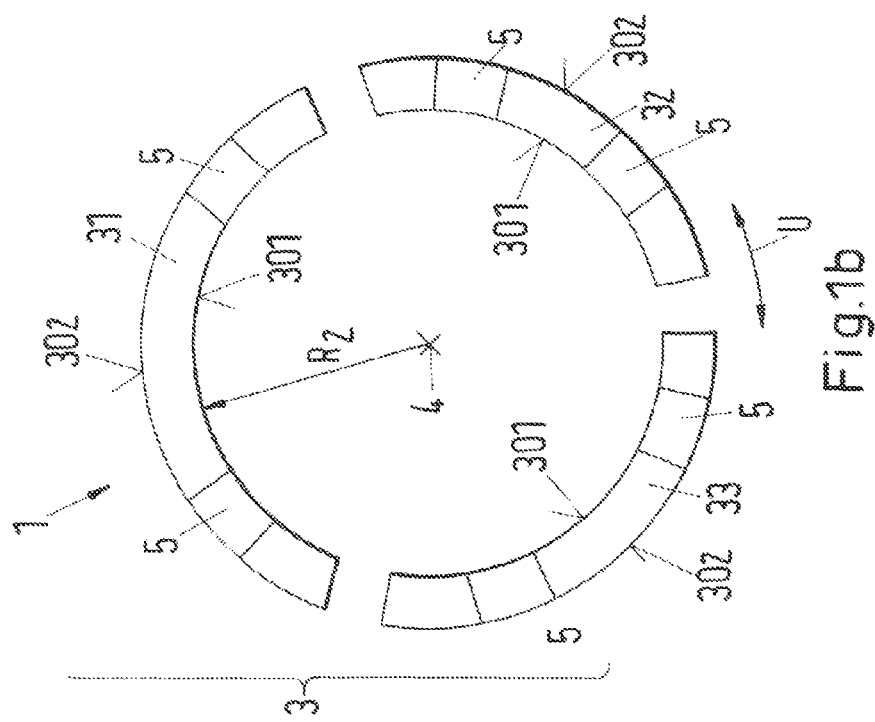
FIG. 1a shows a friction ring in accordance with the invention having a segmented friction ring body in an expanded configuration.

The friction ring 1 in accordance with the invention in accordance with FIG. 1a to FIG. 1d serves for the application in a synchronizer unit 2 of a gear changing transmission, in particular a gear changing transmission for a vehicle, more specifically for a passenger vehicle, a transporter or a commercial vehicle. The friction ring 1 includes a conical friction ring body 3 having an inner friction surface 301 and an outer installation surface 302, which outer installation surface 302 is preferably configured as a further friction surface. The inner friction surface 301 and the outer installation surface 302 respectively bound the friction ring body 3 in a circumferential direction U extending perpendicular to an axial friction ring axis 4. In this respect the inner friction surface 301 conically extends along the friction ring axis 4 at a pre-determinable friction angle $\alpha_1$ and the outer installation surface 302 conically extends along the friction ring axis 4 at a pre-determinable installation angle $\alpha_2$, wherein the friction angle $\alpha_1$ is different from the installation angle $\alpha_2$ in accordance with the invention.

Figure 1B:
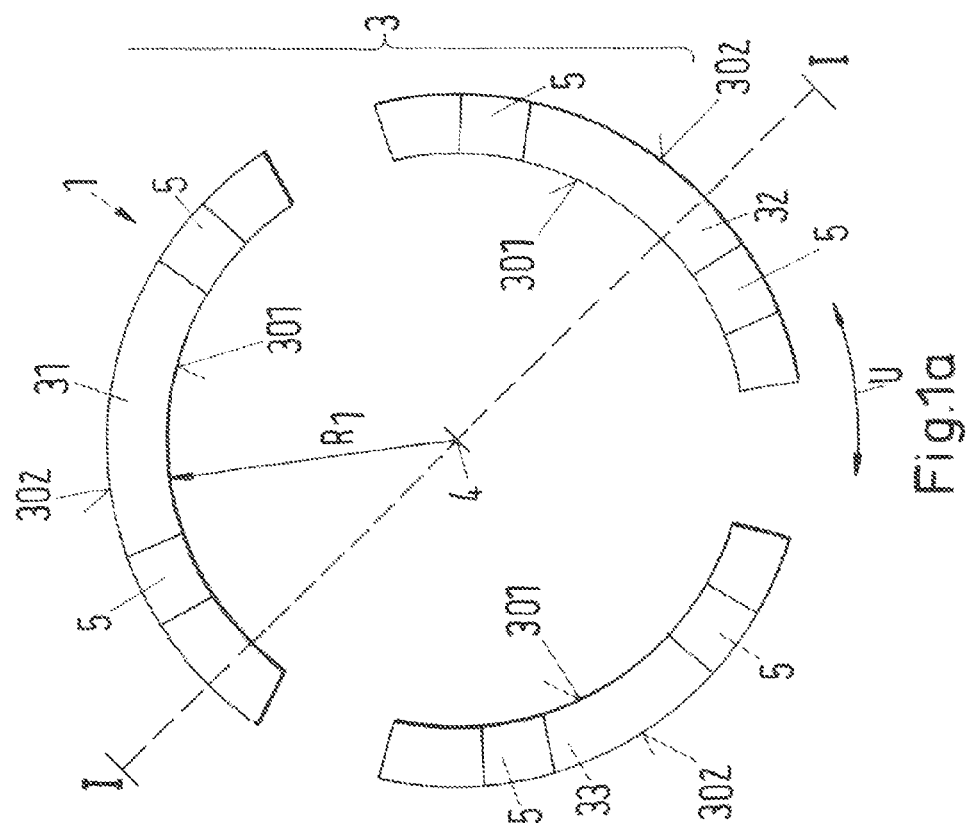
FIG. 1b shows the friction ring in accordance with FIG. 1a shown in a contracted configuration.
Figure 1C:
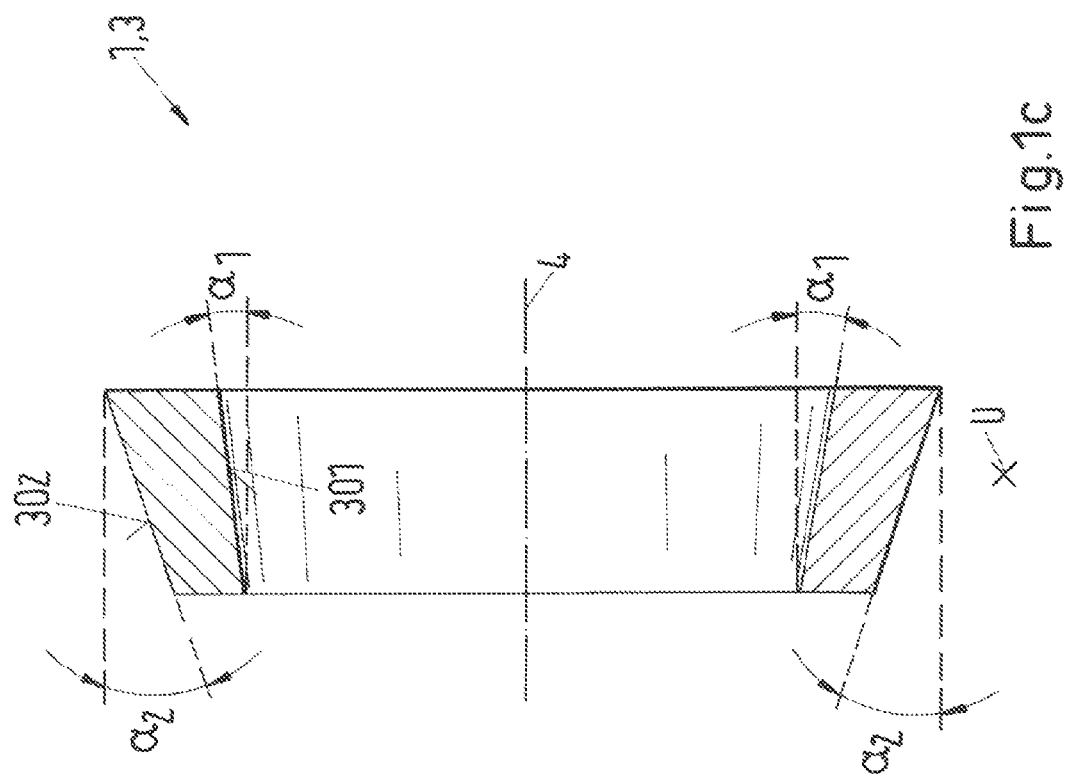

As can clearly be seen, in particular in FIG. 1c, the installation, angle $\alpha_2$ is preferably larger than the friction angle $\alpha_1$, though in principle it is also possible for the friction angle $\alpha_1$ to be larger than the installation angle $\alpha_2$.

As can clearly be recognized with reference to FIG. 1a and FIG. 1b, the friction ring body 3 is a segmented ring body 3 in this special embodiment, which includes a plurality of separate friction ring segments 31, 32, 33, thus three friction ring segments 31, 32, 33 in the present special embodiment, which form the friction ring body 3 in such a way that, in the installed state, the friction ring body 3 has a first radius $R_1$ in a first expanded configuration in accordance with FIG. 1a and in a second contracted configuration has a second radius $R_2$ in accordance with FIG. 1b.

In this connection it is understood that a friction ring 1 in accordance with the invention can also be composed of a different number of friction ring segments 31, 32, 33, 34, for example, also out of four friction ring segments 31, 32, 33, 34 as shown by way of example with reference to FIG. 2a and FIG. 2b or also, for example, only of two friction ring segments or of more than four friction ring segments 31, 32, 33, 34.

In this composition at least one security against rotation 5 is particularly preferably provided at the friction ring body 3, which security against rotation 5 preferably extends along the friction ring axis 4 as one can particularly clearly see from FIG. 1d.

In this connection FIG. 2a and FIG. 2b show the already mentioned different embodiment of a friction ring 1 in accordance with the invention in which the security against rotation 5 extends substantially perpendicular to the friction ring axis 4.

In this connection it is inherently understood that, independent of the shown special embodiments, the number of securities against rotation 5 can be different depending on the embodiment and that an arbitrary number of securities against rotation 5 can be provided. In very special cases it is even possible that the securities against rotation 5 are missing at the friction ring 1 entirely and/or that, for example, other measures can be provided which prevent a twisting of the friction ring 1 in the operating state.

Figure 4:
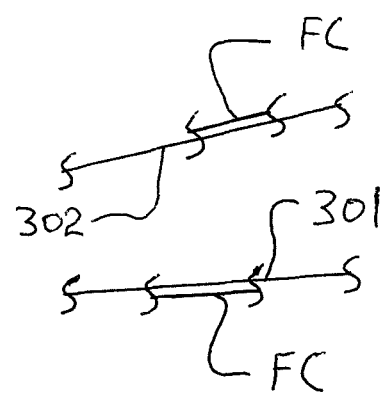
FIG. 4 schematically shows a friction coating arranged on inner and outer conical surfaces of the friction ring.

A friction coating, in particular a friction coating FC in the form of a carbon friction lining, can particularly advantageously be provided, as schematically shown in FIG. 4, at the friction surface 301 and/or at the installation surface 302 which friction coating serves amongst other things to compensate, at least in part, a resulting high mechanical load and/or thermal load of the friction pairing and which is not explicitly shown in the figures for reasons of clarity.

In this connection it is particularly advantageous when the friction ring 1 is a part made of stamped steel or a formed sheet metal part which in particular makes an industrial mass production especially simple or cost effective.

Figure 3:
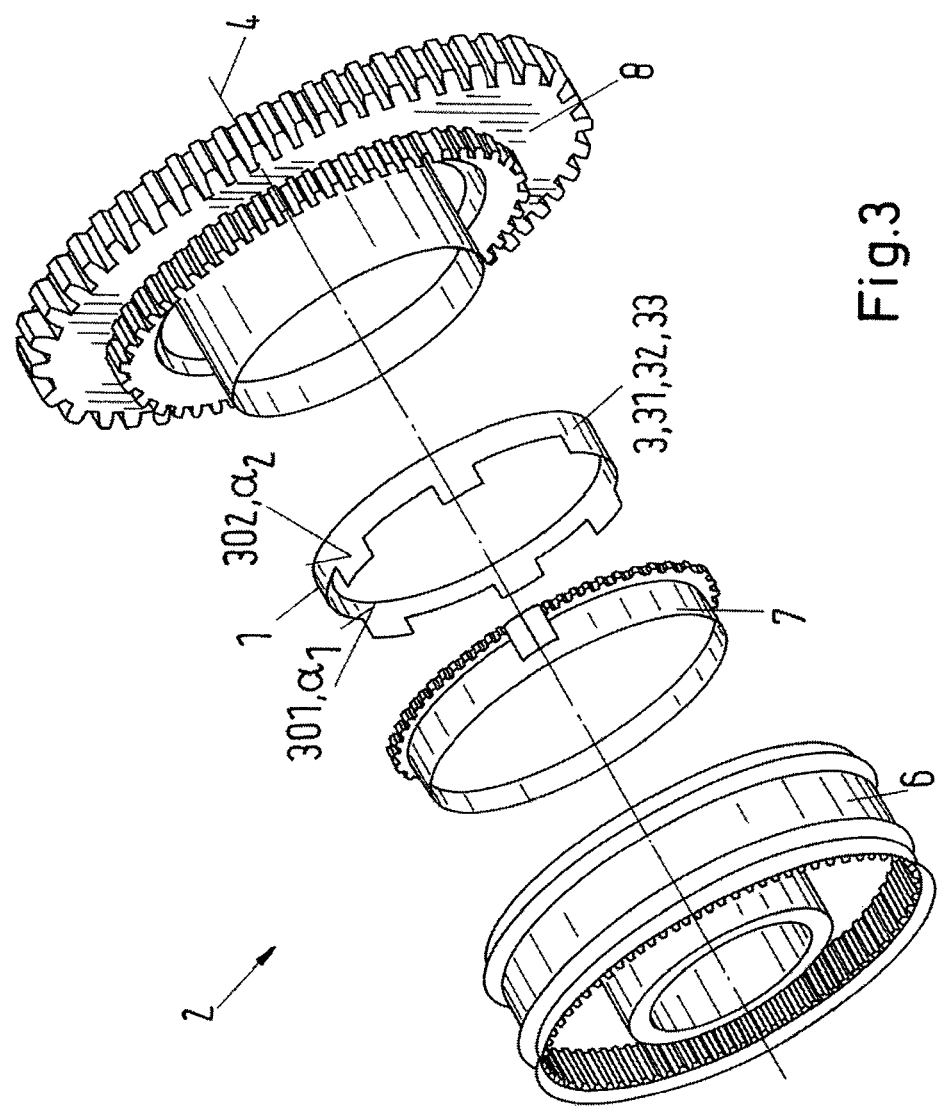
FIG. 3 shows a simple embodiment of a synchronizer unit in accordance with the invention.

The invention further relates to a synchronizer unit 2 having a friction ring 1, as is schematically exemplified by means of FIG. 3.

In addition to the friction ring 1 in accordance with the invention, the synchronizer unit 2 in accordance with FIG. 3 further includes, in a manner known per se: a sliding collar 6, a synchronizer ring 7, as well as a gear wheel 8, with the aforementioned components being arranged coaxially to the friction ring axis 4 such that, in the operating state, the synchronizer ring 7 is moveable along the friction axis 4 together with the friction ring 1 by means of the sliding collar 6 in the direction of the gear wheel 8, so that the inner friction surface 301 can be engaged with the gear wheel 8.

In this connection the synchronizer ring 7 of FIG. 3 is manufactured from stamped steel of conventional design. The cone of the synchronizer ring 7 has the same large inner angle $\alpha_3$, this means it is identical to the installation angle $\alpha_2$ of friction ring 1, with the synchronizer ring 7 having coupling recesses for the segmented friction ring 1, which coupling recesses are known per se and are not shown in detail. The segmented friction ring 1 in accordance with FIG. 3 is configured as three friction ring segments 31, 32, 33 of the same size which is not shown in detail in FIG. 3 for reasons of clarity. In accordance with the invention, the friction ring 1 has the installation surface 302 having the installation angle $\alpha_2$ in this connection with the installation surface 302 being used as a separation surface. The inner cone of the friction ring 1 is formed by means of the friction surface 301 having the friction angle $α_1$, wherein $α_1<α_2$ applies. This inner cone surface, i.e. the friction surface 301, is used for the synchronization.

In the operating state the synchronizer ring 7 is moved axially in the direction of the gear wheel 8, which gear wheel 8 is configured as a toothed gear, and the friction ring segments 31, 32, 33 of the friction ring 1 are thus also included by the angle $α_2$. The synchronizer ring 7 and the segmented friction ring 1 are then simultaneously moved together onto the gear wheel 8 and engage via the inner cone, i.e. the friction surface 301 having the friction angle $α_1$ with the gear wheel 8, which likewise has a corresponding matching female cone having a cone angle $α_1$. The synchronizer ring 7 can then control and index in the manner of a conventional synchronizer ring. The teeth of the sliding collar 6 are in contact with the teeth of the synchronizer ring 7 and thus generate a torque between the segmented friction ring 1 and the gear wheel 8 by the differential speed.

Following the synchronization, when the differential speed is equal to zero, the sliding collar 6 is axially moved, the teeth of the synchronizer ring pass and then the sliding collar 6 can be engaged with the teeth of the flanks of the gear wheel 8. On the basis of this contact there are no more axial forces acting on the synchronizer ring 7. The large angle $α_2$ will separate the system (angle$>\tan^{-1}μ$). This results through the elimination of the forces in the circumferential direction of the segmented friction ring 1. At this point the synchronizer ring 7 and the segmented friction ring 1 break away from the gear wheel 8. The sliding collar 6 can subsequently pass the gear wheel 8. The gear shift is then fully engaged.

In this connection at least two different options 1 and 2 are specifically possible. For option 1 the friction surface or the creation of torque on the inner cone of the segments having the small angle $α_1$. The large release angle $α_2$ is on the outer cone surface of the segments.

In option 2, the friction surface has the small angle $α_1$ on the outer cone of the segment. The large release angle $α_2$ is on the inner cone surface of the segments, with option 1 being the preferred concept in practice.

Finally the invention also relates to a gear changing transmission for a vehicle, in particular for a passenger vehicle, a transporter or a commercial vehicle, which gear changing transmission has a friction ring 1 or a synchronizer unit 2 as has been previously described in detail.

It is understood that all embodiments explicitly disclosed in the present application are only to be understood in examples of the invention and the invention, in particular also covers all suitable combinations which can be used advantageously for special applications and also all further embodiments obvious to the person skilled in the art.

What is claimed is:

1. A synchronizer unit comprising:
   a synchronizer ring configured to move axially relative to a gear wheel when installed;
   a friction ring comprising:
      a first annular side facing the synchronizer ring;
      a second annular side facing away from the synchronizer ring;
      at least one security against rotation extending along a center axis of the friction ring and projecting from the first annular side;
      an outer installation surface oriented at a first angle in relation to the center axis of the friction ring;
      an inner friction surface oriented at a second angle in relation to the center axis of the friction ring; and
      the first angle being greater than the second angle.

2. The unit of claim 1, wherein at least one of:
   the synchronizer ring is stamped steel or sheet metal member; and
   the friction ring is stamped steel or sheet metal member.

3. The unit of claim 1, wherein the synchronizer ring comprises at least one of:
   an internal surface configured to be contact the outer installation surface; and
   an internal conical surface.

4. The unit of claim 3, wherein an angle of the internal conical surface is the same as the first angle.

5. The unit of claim 1, wherein the friction ring is configured to expand and contract radially when installed.

6. The unit of claim 1, wherein the synchronizer ring comprises at least one of:
   circumferentially arranged external gear teeth; and
   circumferentially arranged external gear teeth and an external section without external gear teeth.

7. The unit of claim 1, wherein the friction ring comprises at least two spaced apart end surfaces that form a gap that expands and contracts when the friction ring respectively expands and contracts radially.

8. The unit of claim 1, wherein the friction ring comprises two or more ring segments.

9. The unit of claim 1, wherein the outer installation surface includes a friction material arranged thereon.

10. The unit of claim 1, wherein the inner friction surface includes a friction material arranged thereon.

11. The unit of claim 1, wherein the outer installation surface includes a friction coating arranged thereon.

12. The unit of claim 1, wherein the inner friction surface includes a friction coating arranged thereon.

13. The unit of claim 1, wherein the at least one security against rotation comprises plural securities against rotation.

14. The unit of claim 1, wherein, in an operating state, the synchronizer ring and the friction ring are axially movable along the center axis toward the gear wheel.

15. The unit of claim 1, further comprising a sliding collar configured to move the synchronizer ring and the friction ring toward the gear wheel.

16. The unit of claim 15, wherein the sliding collar comprises internal teeth configured to engage with external teeth of the synchronizer ring and the gear wheel.

17. The unit of claim 1, wherein the inner friction surface is utilized for synchronization and is configured to engage a conical outer surface of the gear wheel.

18. A synchronizer unit comprising:
   a synchronizer ring comprising an internal conical surface and coupling recesses, said synchronizer ring being configured to move axially relative to a gear wheel when installed;
   a friction ring that can expand and contract radially when installed; and
   said friction ring comprising:
      a first annular side facing the synchronizer ring and having a first thickness;
      a second annular side facing away from the synchronizer ring and having a second thickness greater than the first thickness;
      at least one anti-rotation projection extending along a center axis of the friction ring and projecting from the first annular side;
      an outer installation surface oriented at a first angle in relation to the center axis of the friction ring;
      an inner friction surface oriented at a second angle in relation to the center axis of the friction ring;

the inner friction surface being configured to engage with an outer surface of the gear wheel when installed; and the first angle being greater than the second angle.

19. The unit of claim 18, wherein the friction ring comprises at least one of:
spaced-apart ends; and
plural ring segments.

20. A synchronizer unit comprising:
a synchronizer ring comprising an internal conical surface and external gear teeth configured to engage internal teeth of a sliding collar when installed;
said synchronizer ring being configured to move axially relative to a gear wheel when installed;
a friction ring that can expand and contract radially when installed; and
said friction ring comprising:
a first annular side facing the synchronizer ring and having a first thickness;
a second annular side facing away from the synchronizer ring and having a second thickness greater than the first thickness;
plural anti-rotation projections extending along a center axis of the friction ring and arranged on the first annular side;
an outer installation surface oriented at a first angle in relation to the center axis of the friction ring;
an inner friction surface oriented at a second angle in relation to the center axis of the friction ring;
a friction coating arranged on the inner friction surface; and
the first angle being greater than the second angle,
wherein the inner friction surface is utilized for synchronization and is configured to engage a conical outer surface of the gear wheel when installed.

* * * * *